Oct. 15, 1963   C. J. ARNDT   3,107,004
BELT CONVEYOR HEAD SECTION
Filed July 28, 1960   3 Sheets-Sheet 2
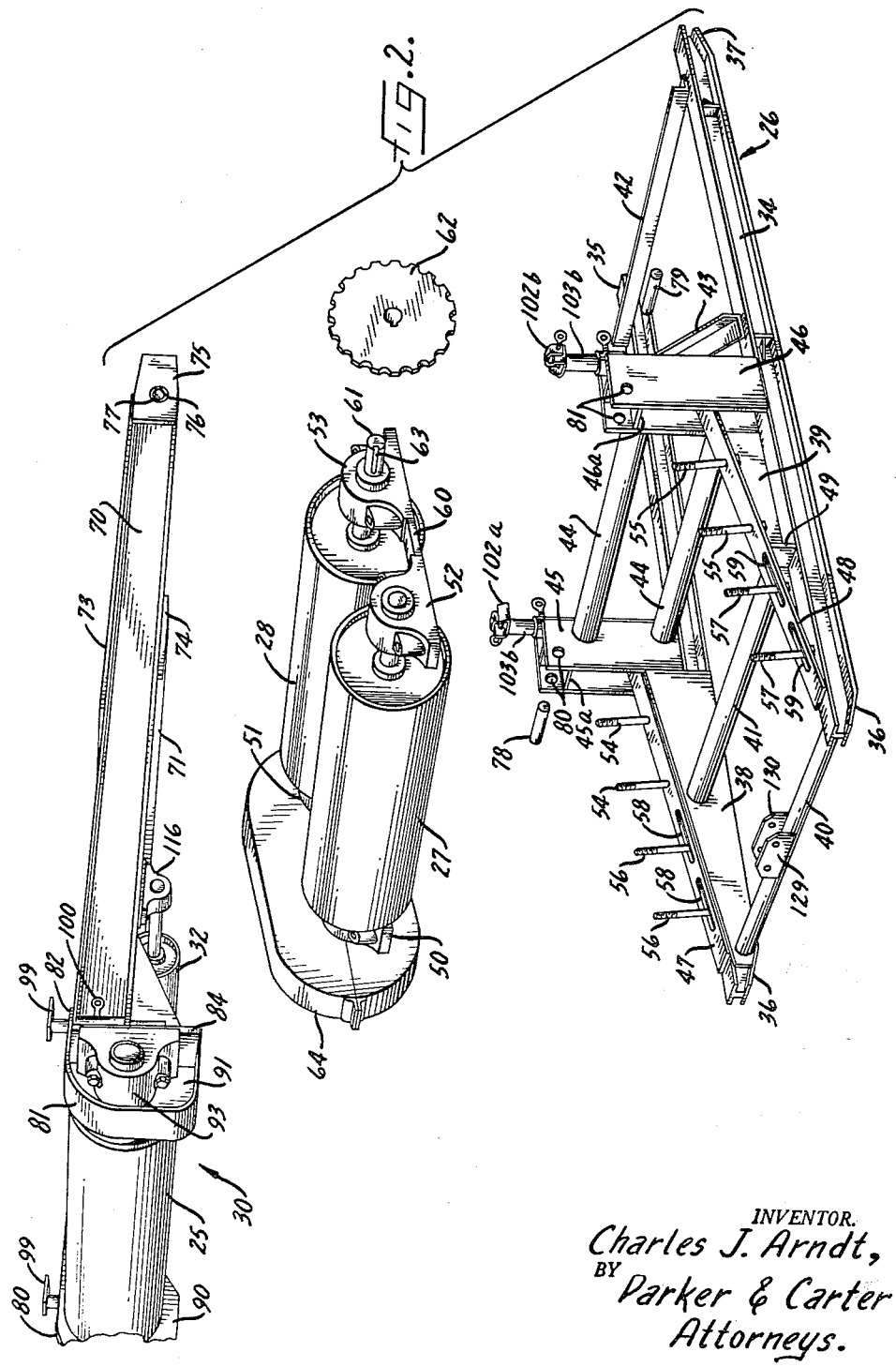
INVENTOR.
Charles J. Arndt,
BY Parker & Carter
Attorneys.

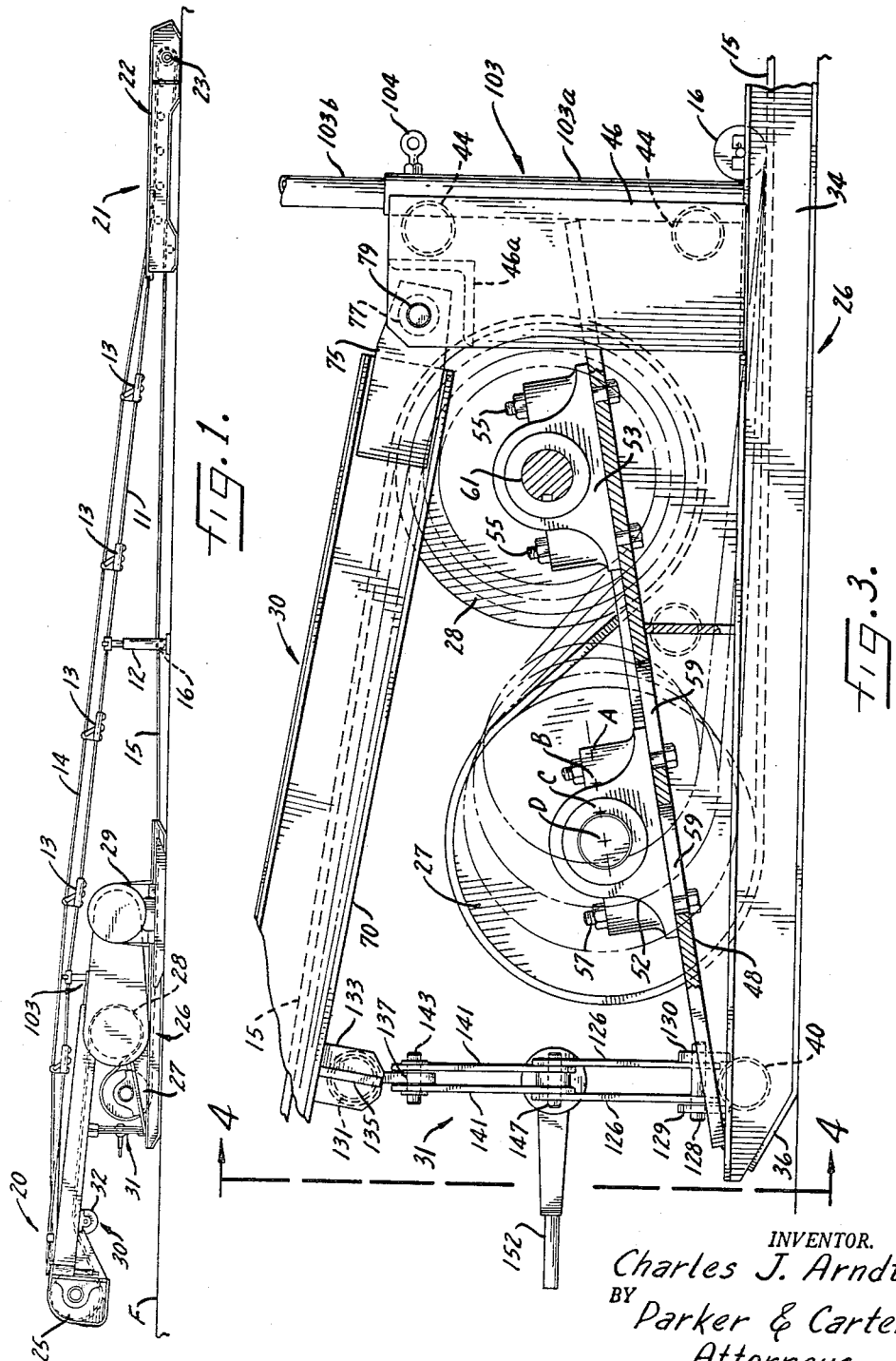

Oct. 15, 1963   C. J. ARNDT   3,107,004
BELT CONVEYOR HEAD SECTION
Filed July 28, 1960   3 Sheets-Sheet 3

INVENTOR.
Charles J. Arndt,
BY Parker & Carter
Attorneys.

United States Patent Office 3,107,004
Patented Oct. 15, 1963

3,107,004
BELT CONVEYOR HEAD SECTION
Charles J. Arndt, Harvey, Ill., assignor to Goodman Manufacturing Company, Chicago, Ill., a corporation of Illinois
Filed July 28, 1960, Ser. No. 45,834
11 Claims. (Cl. 198—204)

This invention relates in general to wire rope sideframe conveyors, and particularly to a unique head or drive section for such conveyors which can be quickly assembled from standard components to accommodate a wide range of belt sizes.

Wire rope sideframe conveyors have come into increasingly widespread use in recent years due to their many desirable features including high-carrying capacity, low cost, and ease of installation and maintenance. These conveyors generally include a pair of wire ropes which are trained in generally co-planar, generally parallel relationship along a conveying course such as a mine haulageway or the like. The ropes are supported at generally equal intervals by suitable supporting structures such as ground engaging support standards. A plurality of troughing idler assemblies are suspended from the ropes to form a bed for the conveying reach of a flexible belt. The return reach of the belt is supported by a plurality of return rollers which may be independently supported or carried by the support stands. A typical wire rope sideframe conveyor is illustrated in the Craggs et al. Patent 2,773,257.

The conveyor belt is continuous and orbitally movable around a head and a tail pulley located at the head and tail section, respectively, of the conveyor. In a coal mine, for example, the tail section of the conveyor is that section which follows the working face of the coal seam. The head or drive section is, in effect, the discharge end of the conveyor.

The belt is generally driven by a source of power located at the head section. Driving power is imparted to the belt by a pair of drive pulleys arranged in tandem and driven by an electric motor. If the conveyor is bodily extensible, such as illustrated in the Craggs et al. Patent 2,862,604, a belt storage loop may be formed in the convey near the head section. If the conveyor is of a relatively fixed length, as would be used in a main or mother conveyor in a coal mine, the belt storage loop may be eliminated. For reference to the general type of head section with which this invention is concerned, attention is directed to the Carlson et al. Patent 2,858,934.

The head sections generally include, in addition to the tandem drive pulleys, a boom which extends forwardly a considerable distance ahead of the forwardmost drive pulley. This boom is usually vertically swingable so as to enable the conveyor to discharge onto a subsequent conveyor running at a level different from the level of the feed conveyor.

Various arrangements have been proposed for properly positioning the tandem drive pulleys with respect to one another so as to maintain efficient driving contact between the belt and the pulleys. Perhaps the most widely used arrangement is a frame structure which includes a pair of oppositely located, horizontally offset steps. The pillow blocks which carry the drive pulleys are mounted on corresponding steps located on each side of the frame. At present, in order to adjust or change the pillow blocks, extensive time-consuming and laborious adjustments must be made in the horizontal direction.

It will be understood that the necessity for varying the position of the pillow blocks arises, in the first instance, from the fact that optimum belt driving efficiency and operating economy are related to the amount of contact between the drive pulleys and the belt. The wider the belt, the less flexible it is, and accordingly the larger the drive pulleys must be in order to provide adequate belt-pulley contact. Large pulley diameters should not be used with small thin belts because considerable power is wasted. In order to change the size of the pulleys, it is also frequently necessary to change pillow blocks. Changing pillow blocks frequently requires changes in the spacing between the blocks.

In addition, it is essential that the drive pulleys be parallel to one another and exactly perpendicular to the direction of belt travel so that the belt will run centered down the conveyor. If the head pulleys are skewed, even to a very small degree, the belt will detrain. To achieve exact parallelism of the pillow block supporting surfaces it is therefore necessary that extreme care be taken during fabrication of the head section. Such care considerably increases the end cost of the section.

In present installations, the pillow block supporting structures may be quite complicated. In effect, every head section is more or less a special piece of equipment requiring special design and construction. The special nature of each head section increases manufacturing costs and causes long delays between initial layout and final delivery.

Present arrangements have other disadvantages. In nearly all present head sections, a rather complicated elevating mechanism is necessary to adjust the height of the boom, and generally adjustments are only possible in a rather rough manner.

Accordingly, the primary object of this invention is to provide a simple, lightweight, portable, efficient head section for a belt conveyor which includes a plurality of interchangeable parts so as to be adaptable to a wide range of conveyor belt sizes.

Another object is to provide a head section for a belt conveyor in which drive pulleys of differing diameters may be quickly and easily positioned and, once positioned, accurately and positively maintained in position to thereby reduce set-up time and maintain the belt centered.

Yet another object is to provide a head section for a belt conveyor in which a wide range of diameters of driving pulleys can be utilized with a single basic frame structure.

Yet another object is to provide a head section for a belt conveyor which includes novel and simple means for elevating the head pulley carrying boom quickly, accurately and in extremely small increments.

Yet a further object is to provide a simple, portable head section for a belt conveyor which can be quickly adapted to drive different size conveyors by merely interchanging pulleys and driving motors.

Yet a further object is to provide a head section for an extensible belt conveyor which is low in overall height so as to be readily adaptable to low clearance operations such as low seam coal mining.

A further object is to provide a head section for a belt conveyor in which manufacturing tolerances need not be held as close as in present structures, thus facilitating fabrication.

Yet another object is to provide a head section for a belt conveyor in which all of the foregoing advantages are retained in a relatively lightweight, comparatively inexpensive, portable structure.

Further objects and advantages will be apparent upon a reading of the following description of the invention.

The invention is illustrated more or less diagrammatically in the accompanying drawing, wherein:

FIGURE 1 is a side elevation of an extensible belt conveyor embodying the head section of this invention;

FIGURE 2 is an exploded view of the head section illustrated in FIGURE 1;

FIGURE 3 is an elevation of a portion of the head section illustrated in FIGURE 1;

Like reference numerals will be used to refer to like parts in the drawing.

Figure 4:
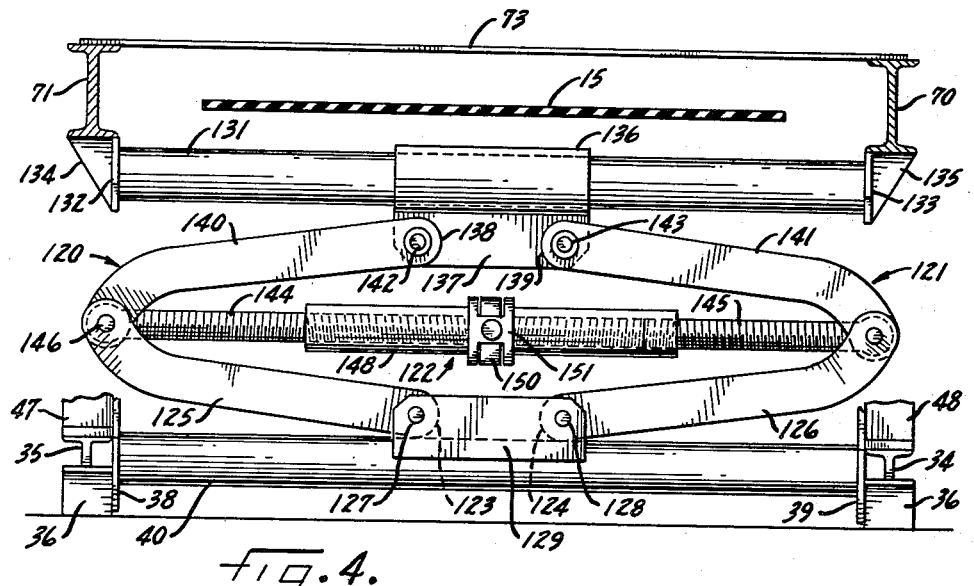
FIGURE 4 is a view taken substantially along the line 4—4 of FIGURE 2 illustrating, primarily, the boom elevating mechanism.

A belt conveyor 10 is shown in FIGURE 1 resting on the floor F of a coal mine or the like. The conveyor includes a pair of flexible strands 11 supported at intervals by ground engaging support standards 12. The flexible strands or wire ropes in turn support a plurality of troughing idler assemblies 13 which form a bed for a conveying reach 14 of a flexible belt. The return reach 15 of the belt is supported by return roller 16 which may be located at substantially greater intervals than are the troughing idler assemblies 13.

The head section of the conveyor is indicated generally at 20 and the tail section at 21. Tail section 21 consists essentially of a movable material receiving structure 22 which carries a tail pulley 23 around which the conveyor belt is trained. It will be understood that in coal mining, for example, the tail section follows relatively closely the working face of the seam. Coal which has been blasted or bored out is dumped onto the tail section and then carried to the head or discharge section by the conveying reach 14 of the belt.

The head section includes a head pulley 25 around which the belt is trained so that the belt, in effect, moves orbitally around the system. Although the figure shows a conveyor of relatively short length, it will be understood that the distance between the head and tail sections may vary considerably, and may run up to as high as 1,000 feet or more.

The head section consists essentially of a skid frame 26 on which are mounted a pair of drive pulleys 27 and 28 arranged in tandem fashion. The drive pulleys are driven by any suitable source of power such as an electric motor 29 which, for convenience, is shown mounted on the frame 26. A boom, indicated generally at 30, is secured to and extends forwardly from the frame 26, and carries the head pulley 25 at its forwardmost end. The boom is raised and lowered by suitable boom elevating mechanism 31. A snubbing or clearance pulley 32 is carried by the boom just to the rear of head pulley 25 to maintain the return reach of the belt above and out of contact with the tandem drive pulleys 27, 28.

The head section is illustrated in detail in the exploded view of FIGURE 2. In this figure, the boom elevating mechanism 31 and motor 29 and its associated power connection to the tandem drive pulleys have been eliminated for the sake of clarity.

Frame section 26 is composed of a pair of I-beams 34, 35 whose forward and rear ends are upwardly inclined as at 36, 37 so as to enable the I-beams to be skidded along the floor F. A pair of truncated, generally triangularly shaped plates 38, 39 are welded to the inside of the I-beams near the front end of the frame, and a plurality of tubular transverse frame members 40 and 41 are welded to the plates to maintain the frame a fixed distance apart. An L-channel 42 at the rear of the skid frame maintains the rear ends of the I-beams a fixed distance apart, and an angularly positioned L-channel 43 supplies rigidity to the frame.

A pair of boom supports 45, 46 are welded to the I-beams 34, 35 near their mid-portions. A pair of tubular cross braces 44, 44 maintain a constant boom gauge. The boom supports may be of any suitable configuration, but in the illustrated embodiment pairs of plates have been illustrated. Corner braces 45a, 46a maintain the upper forward edges of the plates a fixed distance apart for a purpose which will appear hereinafter. A pair of pillow block mounting slides 47, 48 are welded or otherwise suitably secured at their forward end to the upper flange of the I-beams 34, 35, and at their lower ends to the boom supports 45, 46. One or several internal braces 49 may be utilized to rigidify the mounting slides. It will be understood that the mounting slides are so positioned as to be substantially coplanar one to another throughout their length.

The drive pulleys 27 and 28 are secured to the frame by pairs of pillow blocks 50, 51 and 52, 53 which in turn are mounted on the mounting slides. In this instance, the mounting slides have been apertured at their upper ends to receive pairs of clamping bolts 54, 55 which are so positioned as to secure pillow blocks 51, 53, respectively, to the mounting slide. The forwardmost oppositely positioned pair of pillow blocks 50, 52 are clamped to the mounting slides by pairs of bolts 56, 57 which pass through slots 58, 59 formed near the forward, lower end of the mounting slides. Once the pillow blocks have been finally positioned and securely bolted to the mounting slides, they are maintained a fixed, predetermined distance apart by spacer blocks 60. By utilizing spacer blocks of varying lengths and sliding bolts 56, 57 along the slots 58, 59 accordingly, the positions of the drive pulleys can be varied to provide varying belt-pulley contact characteristics.

Shaft 61 of drive pulley 28 is driven by motor 29 through a sprocket wheel 62 which is keyed as at 63 to the end of the shaft. A pair of gears enclosed in housing 64 transfer power from drive pulley 28 to drive pulley 27 so that the pulleys will always rotate at a fixed speed with respect to one another. As a general rule, drive pulleys of equal diameter rotating at equal speeds are utilized.

Figure 5:
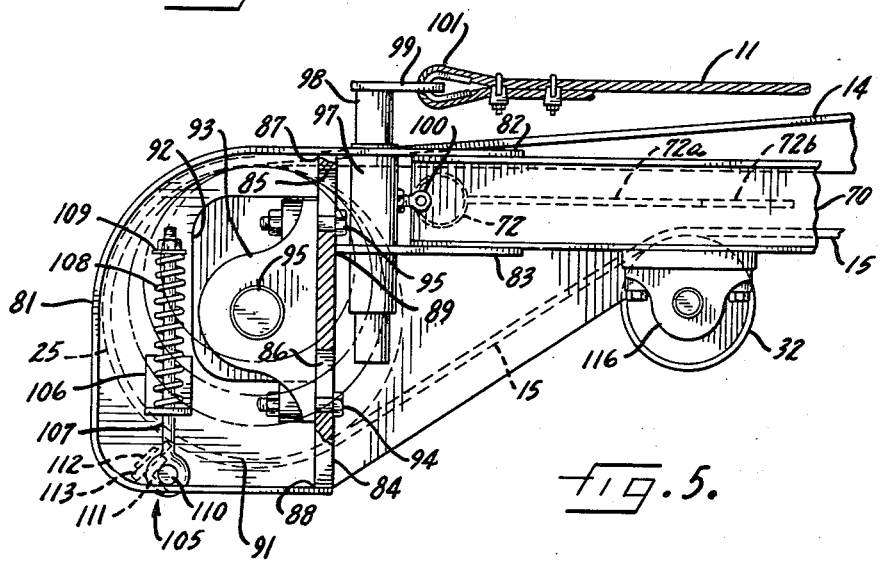
FIGURE 5 is a view partly in section and with parts in phantom of the forward end of the boom.

Boom 30 consists of a pair of I-beams 70, 71 which are maintained a fixed distance apart by a tubular cross brace 72 (FIGURE 5) and a rear cover plate 73. The cover plate serves not only the purpose of maintaining the I-beams fixed with respect to one another, but overlies the drive pulleys and power connections so as to prevent dirt and other foreign material from dropping down into the drive works and fouling operation. A pair of reinforcing braces 72a are welded at their forward ends to the midportion of cross brace 72 and extend rearwardly at approximately a 45° angle. The rear ends are welded as at 72b to the vertical portion of the I-beams 70, 71.

Two pairs of gusset plates 74, 75 are welded to the rear end of each of the I-beams so as to project rearwardly a short distance. Each pair of gusset plates is apertured as at 76 to receive a sleeve member 77. Pivot pins 78, 79 pass through aligned apertures 80, 81 in the upper end of the boom supports 45, 46 and through the bearing sleeves 77. Longitudinal movement of the pivot pins through the sleeve and boom support apertures is prevented by any suitable means, such as cotter pins. As a result, the boom is swingable in a generally vertical plane about pins 78 and 79 as pivot points.

A pair of curved guard plates 80, 81 are secured to the forward end of the boom. The upper, rear portion of each plate is welded to the upper flange of its respective I-beam and overlaps the flange a considerable distance, as at 82. A short guide plate 83 is welded to the bottom flange of each I-beam and extends forwardly a substantial distance, as illustrated best in FIGURE 5. An anchor plate 84 which is slotted as at 85, 86 is welded at its upper and lower ends as at 87, 88, to the guard plate. The forward end of guide plate 83 terminates at the vertical anchor plate 84 and is welded thereto as at 89 to provide additional support for the anchor plate.

A pair of side plates 90 and 91 are welded to the inside edge of the guard plates 80, 81, respectively, and extend rearwardly a substantial distance. The upwardly sloping trailing edges are then welded to the bottom flange of the I-beams 70 and 71. Each side plate is cut away as at 92 to accommodate different sized head pulleys, as will be explained hereinafter.

A pair of head pulley pillow blocks 93 is secured by bolts 94, 95 to the vertical anchor plate 84. The slots 85, 86 in the anchor plate 84 permit different sized pillow blocks to be utilized, or the positions of the pillow blocks to be changed for any reason. The pillow blocks receive head pulley bearing shaft 95 which carries the head pulley 25. Although sufficient clearance has ben provided to receive pillow blocks of varying sizes, a single set of blocks will usually be used.

Plates 81 and 83 are apertured to receive a collar or sleeve member 97 which in turn recevies a wire rope anchor tube 98 slideable in the collar member 97. Any suitable means, such as the set screw 100, may be used to position the anchor tube 98 at any desired elevation. Each end plate 99 is apertured to receive the end 101 of a flexible strand 11.

Flexible strands 11 extend rearwardly and are received in saddle members 102a, 102b which are mounted on the top of vertically adjustable support standards 103. Each standard consists of a lower portion 103a welded to the upper flange of the skid frame I-beams just to the rear of the boom supports 45, 46. The position of the upper, saddle carrying portion 103b is adjusted by any suitable means, such as the eye bolts 104.

A scraper device for cleaning the belt as it passes around the head pulley is indicated generally at 105. In this instance, the scraper consists of an L-shaped foot plate 106 welded to the outside of plate 91 and a long eye bolt 107 maintained vertical by a restoring spring 108 which bears against an abutment washer 109. A similar bolt and foot plate is welded to the outside of plate 90. Side plates 90, 91 are apertured to receive a rod 110 extending across the width of the conveyor. The rod in turn is welded to an L-channel 111 which is approximately as wide as the belt. A clamp plate 112 secures a rubber scraper 113 to the L-channel 111. The upper edge of the scraper is in contact with the return reach 15 of the belt and cleans off any material sticking to the belt after it has passed around the head pulley 25. By suitable adjustment of the bearing washer 109, the rubber scraper can be caused to bear against the belt under any desired tension.

Clearance roller 32 is supported by a pair of pillow blocks 116 welded to the underside of the lower flanges of the I-beams 70 and 71. The clearance roller is positioned rather close to the head pulley so that the return reach 15 of the belt will be immediately elevated to avoid any possible interference between the return reach and the tandem drive rolls.

A screw type elevating mechanism for raising and lowering the boom is indicated generally at 31 in FIGURE 4. The mechanism consists essentially of two sets of tong arms 120, 121 which, when expanded and contracted by the screw and ratchet mechanism 122, raise and lower the boom. Lower ends 123, 124 of tong arms 125, 126 are pivotally connected as at 127, 128 to a pair of pivot plates 129, 130 which in turn are welded to cross brace 40. An upper cross brace 131 is welded at its ends to downwardly depending end plates 132, 133 which in turn are welded to the lower inner edge of the bottom flanges of I-beams 70 and 71. Triangular reinforcing plates 134, 135 provide stiffening. A sleeve 136 from which a pivot plate 137 depends is welded to the upper cross brace 131 directly over the bottom pivot plates 129, 130. The upper ends 138, 139 of upper tong arms 140, 141 are pivotally connected as at 142, 143 to the downwardly depending pivot plate 137.

A pair of screws 144, 145 are pivotally connected at their outer ends as at 146, 147 to the apex of each set of tong arms. The inner ends of the screws are received in a threaded sleeve member 148 which carries a right hand thread at one end and a left hand thread at the other. A ratchet ring 150 is secured to the exterior of sleeve 148 and a pawl member 151, having a handle 152, engages the ratchet ring and extends forwardly where it may be easily manipulated by hand.

The use and operation of the invention is as follows:

This head section may be quickly and easily assembled due to the fact that standardized parts are used in its construction. In addition, drive pulley rolls of varying diameters can be accommodated and accurately positioned utilizing a single set of pillow blocks.

The width of a head section will generally vary with the width of the conveyor belt with which it is to be used. For any given conveyor belt size, the size of the side portions of the head section will be identical. For a narrow belt conveyor, the cross braces 40, 41, 42, 43 and 44 are merely cut to length and welded at their ends to the sideframes to thereby establish the gauge of the head section. The length of the tong arms 125, 126, 140, 141 of the boom elevating mechanism may have to be slightly shortened or lengthened depending upon the width of the section, or a plurality of pivot apertures may be drilled in the pivot plates 137, 129 and 130, so that the sets of tongs may be moved towards or away from one another.

If a narrow belt, such as a 30-inch belt, is to be utilized, pillow blocks 51 and 53 will be moved to their closest positions. Referring to FIGURE 3, pillow block 53 will be in the indicated position, whereas pillow block 51 will be slid up the pillow block mounting slide 48 to the position A. This adjustment is easily made because the securing bolts 57 for pillow block 51 slide easily along the slots 59. For progressively wider belts, the lower pillow block 51 is slid down the slide to positions B, C, and finally D, the latter position being the largest diameter roll position. In the illustrated embodiment, the rolls are spaced a maximum distance apart for use with a wide belt of substantial thickness. It will be noted that only a single set of pillow blocks need be utilized because the clearance between the pillow block mounting slides and the ground is such that there is ample clearance between the bottom of the return reach 15 and the floor F even when large diameter rolls are utilized.

By the same token, only a single pair of pillow blocks 93 need be utilized to carry a variety of sizes of head pulleys 25. In the illustrated embodiment, pillow blocks 93 have been slid downwardly along head mounting slide 84 to the maximum roll size position since a wide belt of substantial thickness is being used. As a progressively narrower and thinner belt is utilized, pillow blocks 93 are slid upwardly along the slots 85, 86 to a desired location.

Although the pillow block mounting slides in this instance have been shown as slotted, it is entirely within the scope of the invention to utilize a plurality of bolt holes. In this event, it may be convenient to use cap screws threaded through aligned tapped holes in the slide and pillow block.

When utilizing threaded cap screws and different sized spacers, many combinations of positions can be achieved by holding the length of the spacer constant and changing the size of the pillow blocks, or vice versa, or both.

To raise and lower the boom, to discharge at various heights, the simple mechanism of FIGURE 4 is utilized. By manually cranking pawl member 152 up and down, screws 144, 145 can be caused to move toward and away from one another which in turn contracts and expands, respectively, the tong arms 125, 126, 140, 141. As the tong arms expand and contract, the boom swings about pivot pins 78 and 79 carried by the boom supports 45 and 46.

When the boom is raised or lowered, support standards 103 and 12 are adjusted accordingly to provide a uniform incline to the carrying reach 14 of the belt.

Another advantage of the present invention is that only one or at most two different size motors need be used with a wide range of belt sizes. For example, for drive pulleys of from 15 to 21 inches diameter, a 50 H.P. motor is quite sufficient, and for pulleys of from 19 to 25 inches a H.P. will suffice. If all pulleys are mounted on the same size shaft, the same pillow blocks can therefore be used for all pulleys.

Although a preferred embodiment of the invention has been illustrated and described, it should be understood that the above description is intended to be illustrative only. Accordingly, the scope of the invention should only be limited by the scope of the following claims.

I claim:

1. A standardized, light weight, portable head section for a belt conveyor adaptable to a variety of sizes of drive pulleys, said head section including, in combination, a skid frame having substantially identical side sections maintained a fixed distance apart by a plurality of transverse substantially rigid frame members, a rearwardly, upwardly inclined drive pulley pillow block mounting slide carried by each side, the pillow block carrying surfaces of the slides being co-planar, a pair of longitudinally spaced drive pulley pillow blocks carried by each slide, each pillow block lying transversely opposite a corresponding pillow block on the other side of the skid frame, means for varying the longitudinal distance between adjacent pillow blocks in small increments, means for maintaining the blocks in transversely spaced relationship to one another and fixed to their respective mounting slide, a boom carrying a head pulley generally horizontally pivotally mounted on the skid frame, said boom and head pulley extending forwardly past the forwardmost transversely oppositely disposed pair of pillow blocks, and means for incrementally elevating the boom to locate the head pulley at any desired elevation.

2. The standardized, light weight, portable head section of claim 1 further characterized in that said boom elevating means includes a pair of oppositely located, upwardly opening sets of tongs, the lower ends of the tongs being secured to the skid frame and the upper ends to the boom, an extensible, horizontally disposed screw mechanism, the extensible ends of said screw mechanism being secured to the sets of tongs so as to induce opening movement of the tongs when the screw mechanism is rotated in one direction and closing movement when rotated in the other direction, and ratchet means for rotating the screw mechanism to thereby raise and lower the boom.

3. A boom assembly for use in a belt conveyor head section of the type in which a pair of tandemly positioned drive pulleys are supported in pillow block structures on a head section frame, said boom assembly, including, in combination, a boom frame formed and adapted to extend a substantial distance forwardly of the forwardmost pillow block structures, pivot means for connecting the boom frame to the head section frame, said pivot means enabling the boom frame to swing in a generally vertical plane, a head pulley assembly mounted on the boom frame, means for incrementally adjusting the position of the head pulley assembly with respect to the head section frame in a generally vertical direction, and a clearance pulley carried by the boom frame, the lower surface of the clearance pulley being disposed above the upper surface of at least the forwardmost head section pillow block structures in all relative operating positions of the boom frame with respect to the head section frame to thereby prevent interference by a belt trained around the head pulley with the tandemly positioned drive pulleys of the head section frame.

4. The boom assembly of claim 3 further characterized in that the head pulley assembly includes a head pulley, a pair of head pulley pillow blocks carried by the boom frame, and means for adjustably mounting the pillow blocks to non-horizontal supporting members of the boom frame, said last named means including a plurality of bolts extending through bolt holes in the pillow blocks and aligned apertures in the pillow block supporting members, said apertures being elongated so that the pillow blocks can be slid along the supporting members to any desired position.

5. The boom assembly of claim 4 further characterized by and including a belt scraper assembly for removing conveyed material which sticks to a conveyor belt passing around the head pulley, said belt scraper assembly including a scraper member extending transversely to the head pulley, and spring-biased scraper member supporting means for urging the scraper member into spring loaded scraping engagement with a conveyor belt passing around the head pulley.

6. A mounting frame assembly for use in a belt conveyor head section, said mounting frame assembly including, in combination,
   a pair of side sections,
   said side sections being maintained in fixed relationship to one another by a plurality of transverse spacing members,
   an inclined pillow block mounting slide carried by each side section,
   each of said pillow block mounting slides having a single planar pillow block carrying surface,
   a pair of pillow blocks located on each pillow block carrying surface,
   each of the pillow block carrying surfaces of said pillow block mounting slides being of a length sufficient to receive a pair of tandemly disposed pillow blocks in longitudinally adjustable relationship to one another,
   the pillow block carrying surfaces of said pillow block mounting slide being co-planar,
   means for securing each pillow block to its associated inclined pillow block carrying surface,
   two drive pulleys, the ends of each drive pulley being received in a pair of oppositely positioned pillow blocks, one pillow block being located on each of the inclined pillow block carrying surfaces, and
   a conveyor belt wrapped about each drive pulley,
   there being a substantial belt wrap about each drive pulley,
   said belt wrap being sufficient to impart a training effect to the belt in addition to drving the belt.

7. The mounting frame assembly of claim 6 further including
   at least a pair of longitudinal spacer members,
   one spacer member for each pillow block mounting slide,
   each of said longitudinal spacer members being of a length, when positioned on its associated pillow block carrying surface, to maintain a precise spaced relationship between a pair of pillow blocks intermediate of which it is located.

8. The mounting frame assembly of claim 7 further characterized in that
   the means for varying the longitudinal distance between adjacent pillow blocks includes a plurality of bolts extending through the pillow blocks and an opening in each mounting slide,
   said bolts being effective to lock the pillow blocks to the mounting slides.

9. The mounting frame assembly of claim 7 further including
   a boom carrying a head pulley mounted on the mounting frame assembly the aforesaid head pulley extending forwardly past the forwardmost drive pulley,
   said boom extending a substantial distance forward of the forwardmost oppositely disposed pair of pillow blocks, and
   a clearance pulley carried by the boom,
   the lower surface of the clearance pulley being disposed above the uppermost drive pulley in all relative operating positions of the boom with respect to the mounting frame assembly to thereby prevent interference between the conveyor belt and pulleys.

10. A light weight, portable head section for a belt conveyor capable of accommodating drive pulleys of varying diameters, said head section including, in combination, a skid frame having side sections maintained in fixed relationship to one another by a plurality of transverse frame members, a pillow block mounting slide carried by each side section, the pillow block carrying surfaces of said slides being substantially co-planar, a pair of longitudinally spaced drive pulley pillow blocks carried by each slide, means for varying the longitudinal distance between adjacent pillow blocks in small increments, securing means for maintaining the pillow blocks fixed to their respective mounting slides and to one another, said skid frame, mounting slides, and pillow blocks being structurally proportioned to maintain drive pulleys of varying diameters a substantial distance above a floor surface, a boom carrying a head pulley mounted on the skid frame and extending forwardly past the forwardmost oppositely disposed pair of pillow blocks, said boom being pivotally mounted to the skid frame for movement in a generally vertical plane, and an incrementally adjustable boom elevating mechanism for positioning the discharge end of the boom at any given elevation.

11. The light weight, portable head section of claim 10 further characterized in that the boom elevating mechanism includes a pair of opposed expandable tongs, the ends of which are connected respectively to the skid frame and the boom, an extensible screw assembly secured to and extending between the expandable tongs and effective to open and close the tongs, and means for extending and retracting the extensible screw assembly to thereby locate the boom at any desired elevation.

References Cited in the file of this patent

UNITED STATES PATENTS

| | | |
|---|---|---|
| 1,005,893 | Schwartz | Oct. 17, 1911 |
| 1,960,506 | Pfleger | May 29, 1934 |
| 2,233,262 | Jacobson | Feb. 25, 1941 |
| 2,463,273 | Holstein | Mar. 1, 1949 |
| 2,577,926 | Stiles | Dec. 11, 1951 |
| 2,890,803 | Vanier | June 16, 1959 |